Feb. 13, 1968   B. E. E. LAVERDANT   3,368,647
SPOT-TYPE DISC BRAKES AND DISC BRAKE FRICTION PADS
Filed Jan. 20, 1966   9 Sheets-Sheet 8

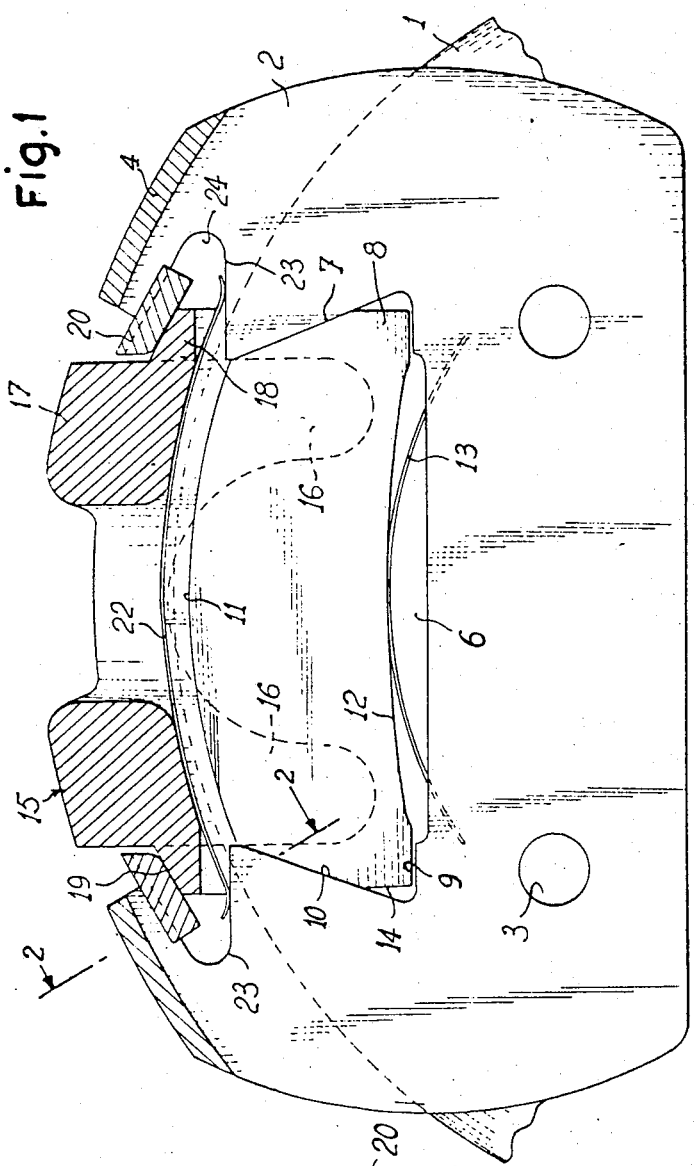
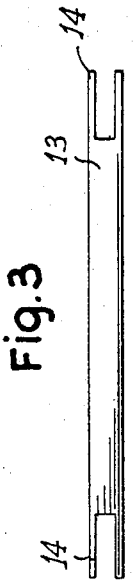
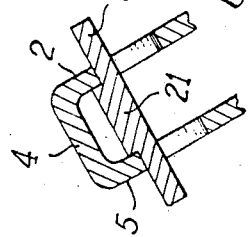
Fig. 1
Fig. 2
Fig. 3

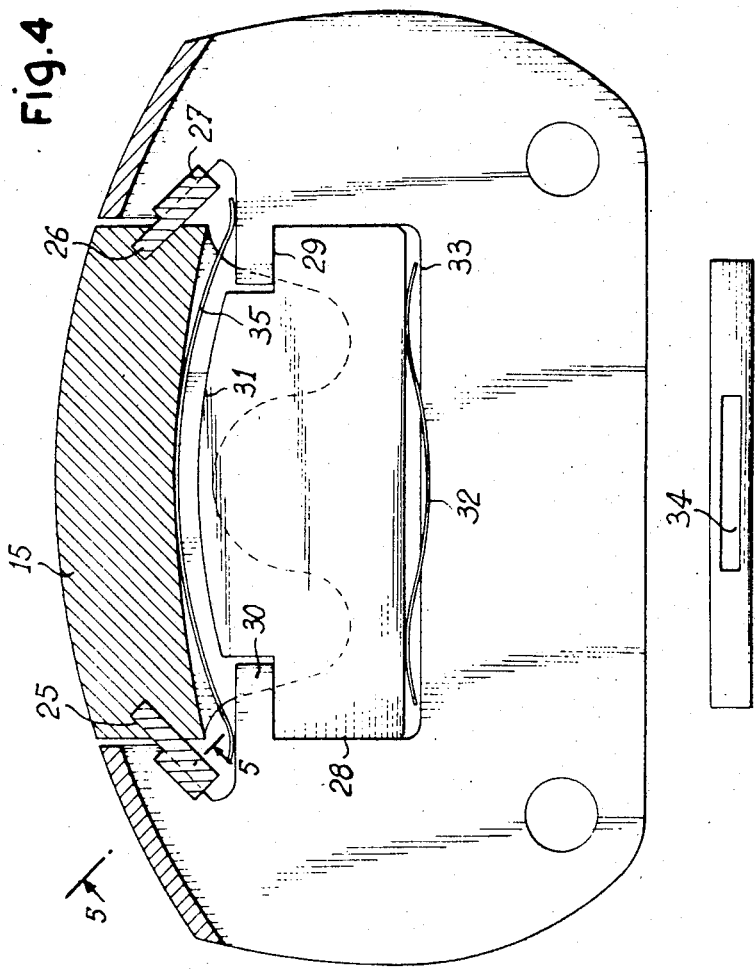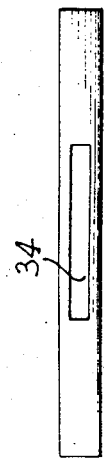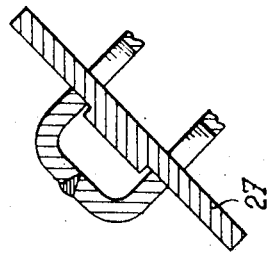

United States Patent Office 3,368,647
Patented Feb. 13, 1968

3,368,647
SPOT-TYPE DISC BRAKES AND DISC BRAKE
FRICTION PADS
Bernard Emile Eugene Laverdant, Paris, France, assignor to Societe Anonyme D.B.A., Paris, France, a company
Filed Jan. 20, 1966, Ser. No. 521,771
Claims priority, application France, Jan. 21, 1965, 2,774; Mar. 23, 1965, 10,384; July 30, 1965, 26,733
15 Claims. (Cl. 188—73)

ABSTRACT OF THE DISCLOSURE

The following relates to a spot-type disc brake having a floating stirrup which is mounted in a recess formed in the limbs of a U-shaped fixed support and is guided in said recess by means of a pair of guide members located at the opposite ends of said recess wherein the lateral ledges of the latter are adapted to act as an anchor for a pair of friction pads located in the recess on opposite sides of the disc.

According to one object of the invention, the stirrup is guided by the fixed support by means of a pair of key members taking abutment onto the limbs of the fixed support and arranged in guiding relation with the stirrup to guide the stirrup movement occurring during operation of the brake and to prevent escape of the stirrup from the recess formed in the fixed support limbs.

Another object of the invention is to provide a disc brake enabling the severing of the functions inherent to the stirrup and to the friction pads, whereby the friction pads have one degree of liberty for movement in an axial direction independently from the stirrup, and the stirrup acts solely as an actuator adapted for floating movement substantially in an axial direction, without affecting the friction pads which are enabled to adjust their position in the recess formed in the fixed support, the guiding of the stirrup being realized by key members which are kept in operative position under the action of a spring insuring the relative position of the stirrup with respect to the key members releasably held on the fixed support.

Another object of the invention is to provide a disc brake in which the releasably mounted key members are interlocked with the fixed support either by a tenon inserted between the fixed support limbs, or preferably by clevis means mounted on the respective edges of the key members on the opposite outer sides of the fixed support limbs.

Another object of the invention is to provide a disc brake construction affording a satisfactory solution between the contradictory requirements assigned by the need of adapting the same brake for wheels of different diameter, however, always reserving a restricted space for the location of the brake, said requirements assigning the need, on the one hand, of having the friction surface located as far as possible from the axis of the brake and, on the other hand, of having the braking torque transmitted as close as possible to the base of the recess to eliminate the tendency of distortion of the ledges defining the anchoring surface of the friction pads and which results in the opening of said edges. This object is realized by conferring to the anchoring ledges of the friction lining carrier metal plate a height comprised between 20% to 50% of the total height of the friction pad, which brings the friction pad action onto the fixed support closer to the base of the recess and thus reduces the leverage intervening in the expression of the moment of flexion resulting from the stresses applied to the fixed support during operation of the brake. For this purpose there are provided on the opposed edges of the peripheral portion of the friction pad a pair of opposite notches located above the braking torque transmitting portions of the friction pads which are bare of lining on the friction lining carrier portions located below the fixed support lugs extending into said notches, so that the friction lining secured to the carrier has substantially the shape of a rectangle, whereby the peripheral reduced-section friction pad portion extends with a clearance between said lugs.

The provision, on the brake lining carrier plate, of regions bare of lining results in the lift of the resultant of the elementary actions of the disc onto the friction pad. By a light increase of the unitary pressure on the lining, there is realized a brake having a radius equivalent to that of a brake with rectangular friction pads, while distributing the stresses on the fixed support in a manner to increase the resistance thereof to powerful braking torque. By equivalent brake radius is designated the brake radius having a length which, multiplied by the applying effort exerted on the movable friction pad, provides the braking torque value.

A further object of the invention is to simplify the design of the stirrup guiding key members by conferring them with a profile corresponding to that of a gap established between the stirrup end projections and the adjacent ledges of the recess formed in the fixed support, said key members being retained in said gap by a pair of clevis means located on the opposite sides of the fixed support. This construction enables the suppression of a tenon on the outer periphery of the key members and therefore the use of a stronger spring subjected to a load which is close to the spring load limit in use, due to the suppression of the excess strain assigned to the spring upon use of tenon-equipped key members and which corrsponds to the reduction of the spring deflection, upon mounting of the stirrup, by a height which is that of the tenon. Now, the use of a stronger spring improves the interlock between the stirrup and the fixed support. The key members have preferably an angle shape, including an inner portion insuring the radial positioning of the stirrup, and an outer portion acting as a positioning shim, keeping in register the symmetry plane of the stirrup with that of the fixed support, the inner portion having a terminal shoulder inclined in a manner to enable an easy insertion into holes provided at the opposite ends thereof of U-shaped wire clevis members, which are sufficiently removed from the adjacent ends of the locking spring to avoid any interference therebetween; the locking spring may be formed with a central circular portion seated in a recess provided on the inner wall of the stirrup bridge portion straddling the disc, thus insuring a proper positioning of the stirrup.

Still a further object of the invention is to provide means increasing the fixed support resistance to the stresses created in operation, and which consist in the interconnection of the fixed support ledges, defining the recess, by a brace member to thus locate the friction pads in a closed window section, the stirrup being arranged to move in the peripheral portion of the recess beyond said brace member.

Finally, another object of the invention is to provide a friction pad including a friction lining carrier plate made from steel and formed at the peripheral edges thereof with a pair of notches, the friction lining secured to said carrier plate having the shape substantially of a rectangle with a circular peripheral edge located between said notches, and extending till the base of said plate whereby the height of the braking torque transmitting carrier plate portions, bare of lining and located below said notches, is comprised between 20% to 50% of the total height of the friction pad, and is preferably about 40% of said total height, thus enabling the transmission of the braking torque closer to the base of the recess formed in the fixed support which permits a better repartition of the stresses generated upon application of said friction pads.

Other objects of the invention are set forth in the specification given hereinafter with reference to the accompanying drawings.

FIGURE 1 is a front view of one embodiment of the invention, the stirrup being broken away along the plane of the disc;

FIGURE 2 is a section taken along the line 2—2 of FIGURE 1, and shows the key member locked between the limbs of the fixed support;

FIGURE 3 is a top view of a blade spring taking abutment at the opposite ends thereof on the fixed support and urging the friction pad into engagement with the inclined ends of the peripheral recess formed on the fixed support;

FIGURE 4 is similar to FIGURE 1 and shows a front view of another embodiment in which the key members project into cavities formed in the end portions of the stirrup;

FIGURE 5 is a section along the line 5—5 of FIGURE 4;

FIGURE 6 is similar to FIGURE 3 and shows another embodiment of the blade spring;

Figure 7:
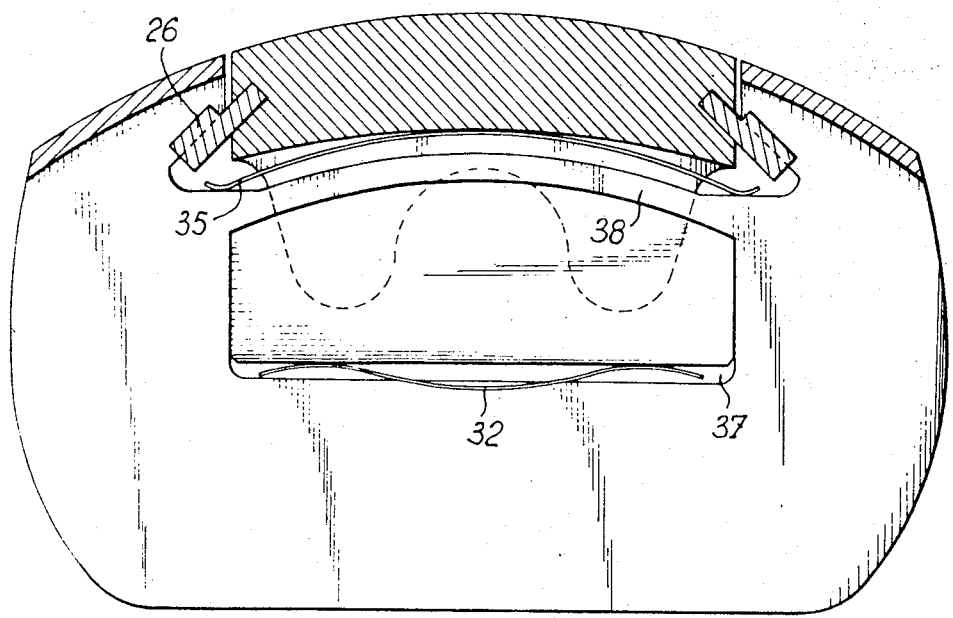
FIGURE 7 is a front view of another embodiment of the invention and shows a brace member arranged at the periphery of the friction pad.

The brake shown in FIGURES 1 to 3 comprises a rotatable disc 1, a U-shaped fixed support secured to a fixed element of the body by bolts, not shown, extending through circular holes 3 formed in the base portion of said fixed support.

The fixed support comprises a limb 2 perpendicular to the axis of the disc, and a bridge portion 4 straddling the disc and extended by an inwardly directed limb 5 which is parallel to the limb 2. On the two limbs of the fixed support is provided a recess 6 which, in this embodiment, is formed with inclined anchor ledges 7 between which is mounted a pair of friction pads 8 having a substantially rectangular base portion formed with straight edges 9 adjacent to the base of the recess. The friction pads have inclined edges 10 having a profile corresponding to that of the adjacent anchor ledges 7 and acting as elements transmitting the braking torque to the fixed support. The friction pad edges 10 are interconneced, at the periphery thereof, by a circular edge 11 forming the friction pad peripheral portion which is arranged opposite to a circular portion 12 extended by the said edges 9 defining together the friction pad base. A blade spring 13 formed with forked ends 14 engages the respective fixed support limb, so that the central portion of this spring exerts a push onto the circular portion 12 of said friction pad base. As shown in FIGURE 1, the edges 9 of the friction pad base are connected to the inclined edges 10 by a straight edge 14 which clears the adjacent angle of the recess 6.

The friction pads are actuated by means of a stirrup indicated generally by the numeral 15, which straddles the disc as well as the friction pads. The friction pad shown in FIGURE 1 is the movable pad which is actuated by a cylinder, not shown on said FIGURE 1. The pressurization of this cylinder, on the one hand, displaces this friction pad into frictional engagement with the disc, as disclosed in Louis Coatalen, United States Patent No. 3,220,512 and, on the other hand, creates a reaction which determines a displacement of the stirrup parallel to the axis of the disc and the application, through the intermediary of a reaction means connected to the stirrup, of the fixed friction pad onto the opposite face of the disc. The stirrup extensions 16 define therebetween a semi-circular gap which clears the space required for the passage of the tools for machining the cylinder bore provided in the stirrup.

The stirrup 15 is made by molding and, as shown, the peripheral portion of the stirrup may be lightened in its middle, in order to provide reinforcement members 17 located in register with the extensions 16 in the area of the stirrup subjected to maximum stress. The reinforcement members 17 are extended by end projections 18 having a flat surface 19 directed to the periphery while being parallel to the axis of the hydraulic cylinder which is perpendicular to the abutment plane of the extensions 16 onto the fixed friction pad. The surface 19 of the end projections cooperates with a complementary surface provided on a pair of key members 20 formed with an integrally made tenon 21 which is engaged between the limbs 2 and 5 of the U-shaped fixed support.

An independent blade spring 22 takes abutment at the respective ends thereof on the edge 23 of notches 24 formed in the fixed support, and joined to the inclined edges 10 by the straight edge 23 so that the central portion of this spring engages the bottom of the peripheral portion of the stirrup and urges the latter into engagement with the key members 20. Due to the push of the independent spring 22, transmitted through the intermediary of the stirrup, the key members are urged towards the top of the notches 24, the tenon 21 being thus engaged between the two limbs of the fixed support, thus preventing any axial displacement of the respective key members. To insert into position the key members, the stirrup is mounted against the resistance of the spring 22 and this spring is then compressed in order to clear, between the surface 19 of the stirrup end projection and the inclined edge 23 of the notch 24, a sufficient gap to enable the insertion of the key members 20, parallel to the axis of the disc. When the tenon 21 is brought in front of the space provided between the two limbs of the fixed support, the pressure on the stirrup is relieved and the spring 22 snaps the key members into position, the tenon 21 acting as a lock member fitted between the limbs 2 and 5 of the fixed support.

The embodiment shown in FIGURES 4 to 6 is similar to the embodiment described above, and comprises inclined cavities 25 formed in the respective edges of the stirrup. The key members 26 are formed with a tenon 27 extending up to the portion of the key member projecting into the cavity. The brake is assembled in a manner similar to that described above. In this embodiment, the projecting end portion which are defined by the edges 28 of the wider friction pad portion, which are adapted to transmit the braking torque to the fixed support, exert a function which is dissociated from that of the narrower recessed friction pad portion which projects, with a predetermined clearance, towards the periphery between the lugs 30 formed on the respective limbs of the fixed support and which extend into the rectangular notches provided on the opposite edges of the friction pad to thus provide means for holding the friction pads in the recess 6. It is to be noted that the narrower friction pad portion is formed with a peripheral circular portion 31.

The blade spring 32 which exerts a push onto the base of the friction pad is bent towards the inside of the brake and takes abutment onto the straight base 32 of the recess. This spring 32 is formed with a central groove 34 through which is engaged the respective bottom of said recess, the push exerted onto the friction pad being transmitted thereto by the ends of said spring.

A separate blade spring 35 urges the internal edges of the inclined cavities 25 provided on the stirrup into engagement with the internal surfaces of the key members 26 to thus guide the stirrup by the fixed support independently from the friction pads which are guided by separate means, namely by retaining lugs 30 and by ledges 28 of the recess 16, which are perpendicular to said lugs. A more detailed statement in connection with the distribution of stresses in this embodiment, in which the recess 6 on the periphery of the fixed support is formed with lugs 30 extending into rectangular notches provided in the friction pads edges 28 will be given hereunder with reference to a similar embodiment shown in FIGURE 16.

The embodiment shown in FIGURE 7 is similar to that shown in FIGURES 4 to 6 and is characterized by the arrangement of the friction pads in windows 37, the peripheral element of which is formed by a brace member 38 which opposes a tensile resistance to the tendency of distortion of the lateral ledges of the said windows, when the brake is set into action thus enhancing the resistance of the fixed support to the stresses assigned thereto upon application of the brake. In this embodiment, the peripheral edge of the friction pads, due to the push exerted by the blade spring 32, is urged into engagement with said brace member. The stirrup 15 is guided by independent means, i.e. by means which do not require any attachment to the fixed support, comprising the key members 26 taking abutment onto the edges of the recess formed in the fixed support, said stirrup being urged into engagement with a guiding surface, or surfaces, provided on said key members by the separate blade spring 35 likewise taking abutment onto an element of the fixed support.

Figure 8:
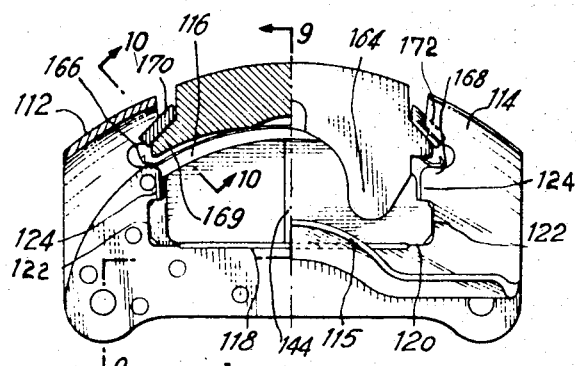
FIGURE 8 is a front view of still another embodiment of the invention in which the friction pads are formed at the opposite edges thereof with a pair of notches and in which the stirrup is guided by a pair of key members taking abutment onto the fixed support limbs and providing guiding surfaces for the stirrup end projections.
Figure 9:
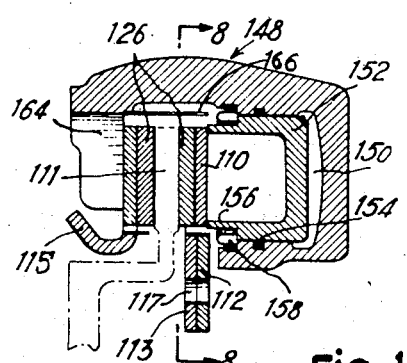
FIGURE 9 is a sectional view along the line 9—9 of FIG. 8.
Figure 10:
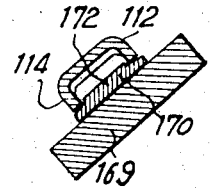
FIGURE 10 is a section taken along line 10—10 of FIGURE 9 and shows the guiding of the stirrup end projections by the key members.

Another embodiment shown on FIGURES 8 to 10 is similar to that shown on FIGURE 4 and comprises a generally U-shaped fixed support 110 which straddles the disc 111; the support has a pair of limbs 112 (shown on the left of FIGURE 8) and 114 (shown on the right of FIGURE 8). The rigidity of the limb 112 is increased by a reinforcement plate 113 located adjacent the disc. A similar arrangement is used to reinforce the rigidity of the limb 114. In each of said limbs is provided a recess 116 formed with a straight base 118 extended by two shoulders to support the respective friction pad base edges 120. The end portions of the limb 114 may be connected by a brace member 115 to form a fixed support unit provided with aligned holes 117 through which extend securing bolts not shown. This recess 116 has two ledges 122 perpendicular to the base 118 and formed on the peripheral portion of the recess with two lugs 124 which define therebetween a narrower section which opens towards the periphery. The friction pads 126 have a steel friction lining carrier plate 128 to which is secured a friction lining block 130 the shape of which is described hereinafter. Said reinforcement plate comprises a rectangular portion 132 extending all along the base, and the respective edges of which form braking torque transmitting edges 134; said reinforcement plate is extended by a narrower portion 136 guided between said lugs 124, thus forming on the carrier plate rectangular notches 138. The peripheral edge 140 of the friction pads has a circular shape. The distance between the two lugs 124 is selected in order to leave a suitable clearance between said lugs and the adjacent edges of the carrier plate narrower portion 136 in order to insure an efficient anchoring of the braking torque transmitting edges 134, upon actuation of the brake, onto the anchor ledges 122 of the recess 116 to absorb the braking torque transmitted by the respective friction pads; due to the said clearance, the anchoring of the braking torque transmitting edges 134 takes place without interference with the narrower carrier plate portion 136.

Figure 11:
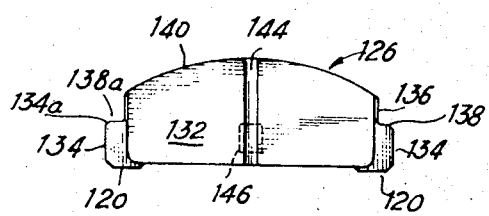
FIGURE 11 is an isometric view of the friction pad embodying the invention.
Figure 12:
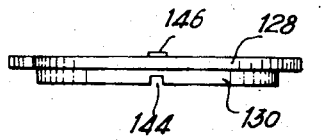
FIGURE 12 is an end view of the friction pad shown on FIG. 11.

As shown in FIGURES 11 and 12, the friction lining block 130, suitably affixed on the carrier plate, is formed about the middle thereof with a groove 144 located along the symmetry plane of the friction pad to suppress thermal distortion of the lining under the effect of high temperature generated during braking. It is to be noted that the action of the friction pad on the fixed support is only transmitted through the intermediary of the carrier plate 128 formed with braking torque transmitting edges 134, the outer ends of which may be connected, by a beveled flat 134a to the carrier plate edges 128a located opposite the base edges 120. The rear face of said carrier plate 128, opposite to that which carries the lining 130, may be formed with a tenon 146 which may be located at a certain distance from the axis of the piston and which is adapted to engage into a slot provided on the working face of the control piston to prevent the rotation of the piston in the actuator cylinder, which is necessary for pistons equipped with an automatic adjusting device with male and female screws. The location of the tenon 146, which may be shaped as an elongated rectangle, at a certain distance from the piston axis enhances the locking effect of said tenon. As it will be described hereunder, the outer peripheral edge of the carrier plate may be formed, at the opposite ends thereof, with a pair of recesses adapted to act as an abutment for limbs bent from the spring 166.

The brake actuation mechanism comprises a stirrup, designated generally by the numeral 148, equipped with a blind cylinder 150 wherein slides a reciprocably mounted piston 152. A rubber annular washer, such as O-ring 154, located in a groove formed on the wall of the working chamber of the cylinder insures the sealing of the piston 152. The end of the piston adjacent to the disc has a reduced diameter edge 156 and a sealing bellows 158 formed with a thickened end engaged into a groove provided at the end of the cylinder, said bellows has at its other end a folded wall inserted onto the edge 156 of the piston. The bellows has a fold of a sufficient amplitude to allow a free displacement of the piston 152, while insuring protection of the cylinder against entrance of contaminants. The stirrup 148 is integrally made with semi-circular extensions 164 shown at the left of FIGURE 9. These stirrup extensions have a shape providing a circular gap to allow the entrance of machining tools into the working chamber of the cylinder, as shown in FIGURE 8.

The stirrup is held on the fixed support by a locking spring which may be a blade spring 166, inserted between the internal wall of the stirrup and the fulcrums 168 provided on the peripheral edge of the lugs 124 integrally made with the fixed support. The spring 166 is thus submitted to a static load which urges the external surfaces of the stirrup into engagement with key members 170 taking abutment onto the respective limbs 112, 114 of the U-shaped fixed support. The key members are formed with a tenon 172 inserted between the parallel limbs of the fixed support.

It is to be noted that the edges of the key member 170 adjacent to the tenon 172 are sloped, as shown on FIGURE 10, whereby a self-centering of said key member in the cavity formed between the limbs 112 and 114 of the U-shaped fixed support is provided.

According to the invention, the height of the rectangular portion 132 of the friction lining carrier plate, which is located below the notches 138, has a value comprised between 20% to 50% of the total height of the friction pad, and is preferably about 40% of said total height. It results by a suitable choice of the parameters, the reaction of the fixed support is drawn closer to the axis of the disc, i.e. closer to the base 118 of the recess, thus reducing the tendency of the recess ledges to open under the effect of distortion when the friction pads take abutment, under load, on said ledges upon actuation of the brake.

Figure 16:
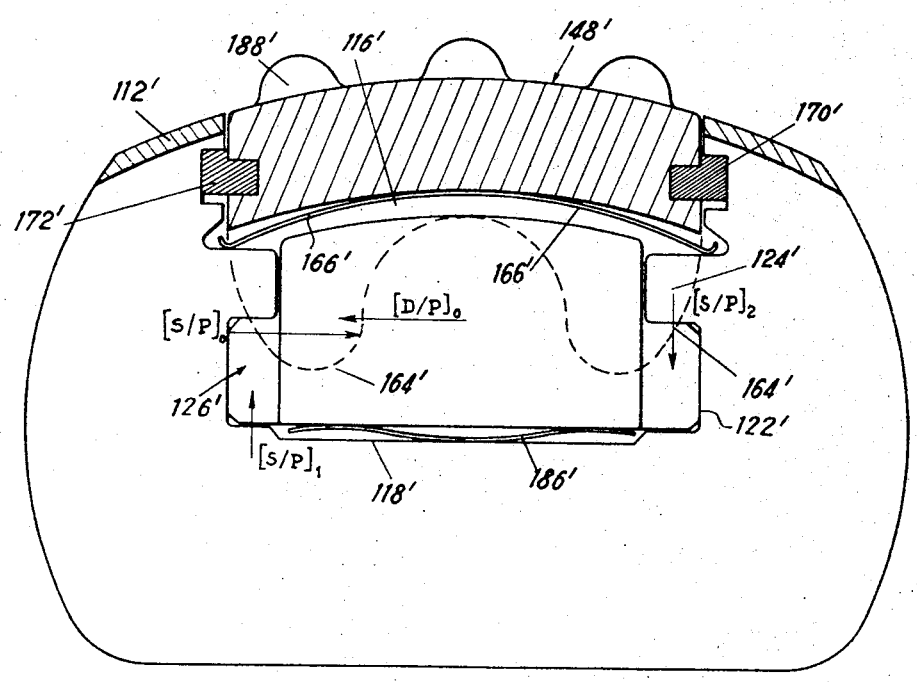
FIGURE 16 is an embodiment similar to that shown on FIGURE 8 but in which the key members are arranged parallel to the base of the recess formed in the fixed support.

The stresses generated upon application of the brake embodiment shown in FIGURES 8 to 10 are brought to light with reference to a similar embodiment shown in FIGURE 16 which carries the following designations:

$[D/P]_0$ indicates the resultant of the elementary actions of the fixed support onto the friction pad;

$[S/P]_0$ indicates the resultant in the opposite sense of the elementary actions of the fixed support onto the friction pad;

$[S/P]_1$, $[S/P]_2$ indicate the forces which represent the reaction of the fixed support onto the friction pad respectively applied to the base 118 of the recess and to the opposite lug 124 formed on the fixed support.

From said FIGURE 16 it appears that the setting into action of a brake embodiment, in which the recess in the fixed support is formed with lugs extending into corresponding notches formed at the opposite edges of the friction pad, generates two equal antagonistic forces formed, on the one hand, by the resultant of the actions of the disc onto the friction pad—designated as $[D/P]_0$—and, on the other hand, by the fixed support reaction (opposite to the action exerted by the friction pads onto the fixed support)—designated as $[S/P]_0$— cannot act along the same axis, due to the lowering of the application point of the said reaction which, as exposed in the preamble of this application, is realized by conferring to the carrier plate anchoring edges a height which is a 20% to 50% fraction of the total height of the friction pad. There is thus generated a couple of forces which is balanced by an antagonistic couple of forces $[S/P]_1$ and $[S/P]_2$ which represent the fixed support reaction onto the friction pad; this antagonistic couple of forces is obviously a source of stresses, but the latter have such a direction and such an intensity that they cannot affect the rigidity of the fixed support.

There will now be described the assembly of the brake embodiment shown on FIGURES 8 to 15: the two friction pads 126 are mounted, on each side of the disc, into the recess 116 formed in the limbs of the fixed support. The blade spring 166 is mounted onto its fulcrums 168 formed on the fixed support, and the unit so assembled is covered by the stirrup 148 which is introduced into the recess formed on the fixed support. Said stirrup is then pressed against the resistance opposed by the spring 166 to provide a clearance for key members 170 which are laterally engaged till the tenons 172 are in front of their respective cavity formed between the limbs 12, 14 of the U-shaped fixed support. The stirrup is then relieved and, under the action of the pressure applied by the stressed spring 166, the tenons are snapped into the respective cavity provided between the limbs of the U-shaped fixed support, interlocking thus the key members. The stirrup is thus secured to the fixed support through the intermediary of said key members, thus preventing any radial displacement of the stirrup, while reserving the liberty of axial displacement of the stirrup as well as of the friction pads.

Figure 13:
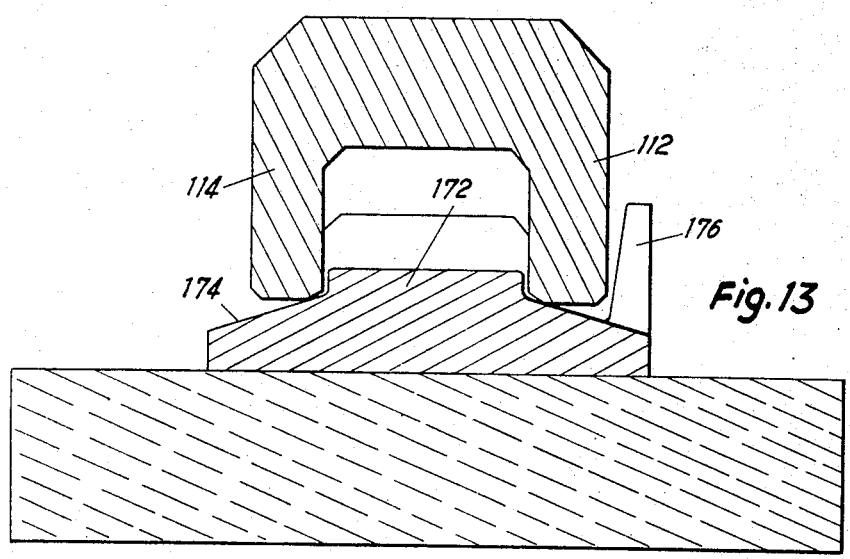
FIGURES 13, 14 and 15 show an embodiment of the key members.
Figure 14:
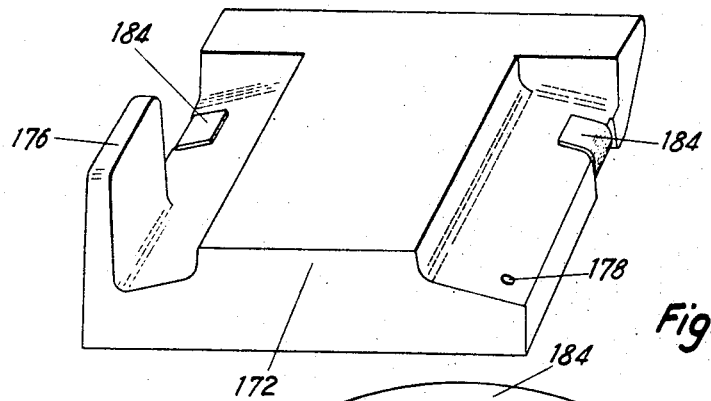
Figure 15:
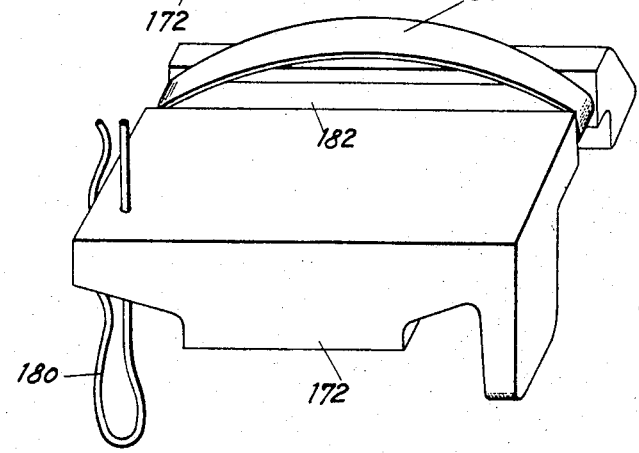

In FIGURES 13, 14 and 15 is shown, at an enlarged scale, an embodiment of the key members similar to those hereabove described, but which is equipped with means adapted to prevent the lateral escape of the key members in case of breaking of the spring 166, in which case the tenon of the key members might escape from the cavity provided between the limbs of the fixed support.

The key member 174 shown in FIGURE 13 is formed at one end with an ear 176 perpendicular to the bearing face of this key member on the respective end projection 169 of the stirrup, and, at the opposite end, with a hole through which is inserted a clevis 180. The ear 176 and the clevis 180 are of sufficient size to prevent, in case of breaking of the blade spring 166, the escape of the key member 170, which escape would risk to make the stirrup free and thus cause a failure of the brake. The means described bring a relief to this danger.

The key member is formed on its bearing face onto the respective end projection of the stirrup with a groove 182 in which is mounted a blade spring 184 the ends thereof are folded to insure the hooking of this spring in said groove. This spring provides an additional safety by preventing any disengagement of the tenon in case of failure of the spring.

As stated above, the embodiment shown in FIGURE 16 is similar to the embodiment shown in FIGURE 8 hereabove desecribed and the similar members are indicated by the same reference numerals. As shown in FIGURE16, the stirrup 148' is connected to the fixed support through the intermediary of key members 170', the base of which is parallel to the base 118' of the recess 116', said key members are engaged into complementary cavities formed on the respective end-projection of the stirrup 148'. The fixed support is similar to that described with reference to FIGURE 8 and the elements of the friction pads 126' have a ratio equal to that of the elements of the friction pads in the embodiment described with reference of FIGURES 8 to 15. It is to be remembered that this ratio is characterized in that the height of the portion of the friction pad limited by the anchorage edges has a value of 20% to 50% of the whole height of the friction pad and is preferably, about 40% of the latter. It is to be noted that in addition to the blade spring 166' which retains the stirrup on the fixed support, an additional blade spring 186' is provided which is inserted between the base 118' of the recess and the adjacent base of the friction pad, the latter being thus biased into engagement with the upper face of lugs 124'. As shown in this FIGURE 16, the stirrup is provided on its periphery with axially directed reinforcement ribs 188'.

This brake embodiment operates in the same manner as the brake embodiment shown on FIGURES 8 to 10, and the distribution of stresses carrying the designations listed above, is the same.

Figure 17:
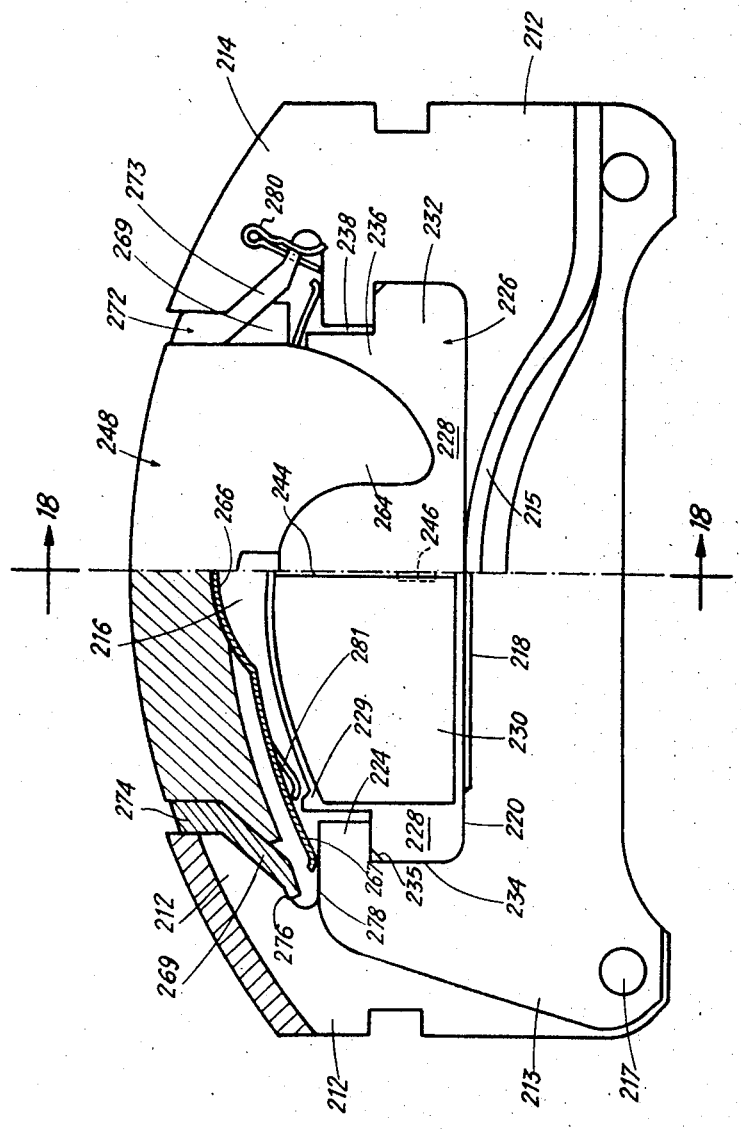
FIGURE 17 is a front view of the preferred embodiment of the invention, the lefthand portion of the stirrup being taken away.
Figure 18:
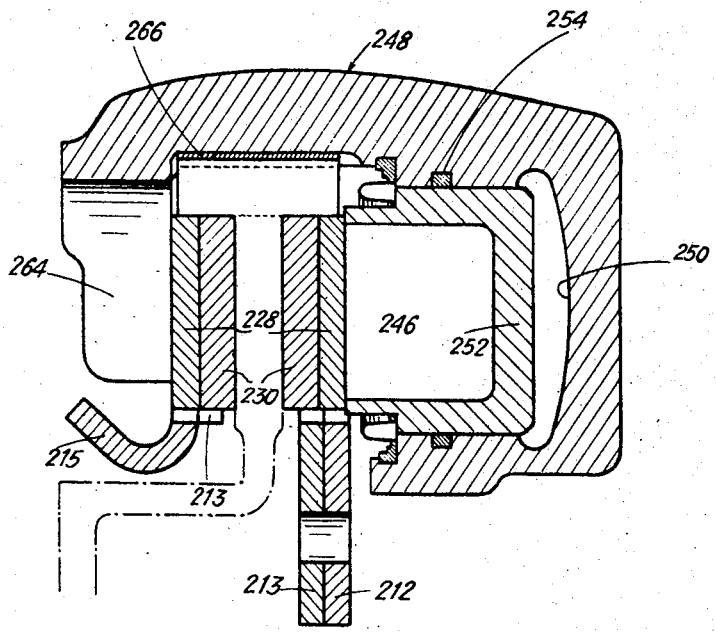
FIGURE 18 is a sectional view along the line 18—18 of FIG. 17.
Figure 19:
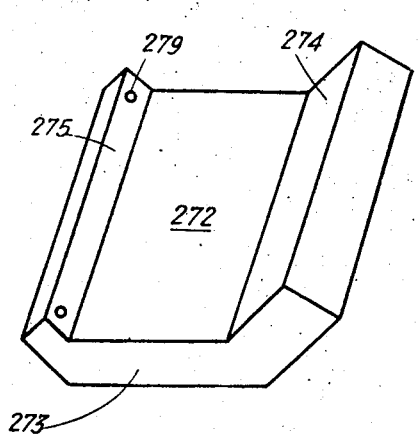
FIGURE 19 is a view of the key members forming part of the embodiment shown on FIGURE 17.

The preferred embodiment of the invention shown on FIGURES 17 to 19 is similar to that shown on FIGURES 8 to 10, and the similar members are indicated by the same reference numerals on which the decimals are preceded on the FIGURE 2.

It is briefly recalled that in this embodiment the recess 216 formed in the fixed support 212, 214 has a straight base 218 extended at the two sides thereof by shoulders 220 which act as a seat for the friction pad 226 provided with a steel carrier plate 228 formed with a wider section 232 having projecting end portions retained by the lugs 224 which extend from the respective limbs 212, 214 as well as from the reinforcement plates 213 secured to said limbs. The friction lining block 230 secured to the carrier plate has the shape substantially of a rectangle corresponding to the profile of the narrower peripheral section of the carrier plate guided with clearance between lugs 224. The friction pads are thus provided at the opposite ends thereof with rectangular notches 238 into which project said lugs. A clearance is provided between the profile of the friction lining block and the edges of the carrier plate. The narrower section of the carrier plate forms substantially right angle projections 229 towards the periphery beyond the circular edge of the friction lining. The anchor ledges 234 of the wider section 232 of the carrier plate may be connected by a beveled flat 235 to the adjacent edge which is guided by the lugs 224. The wider section 232 of the carrier plate has a height corresponding to the ratio described above, and which is about 40% of the total height of the friction pad. The rear surface of the carrier plate 228 may be provided with an elongated tenon 246 located in register with the lower portion of a groove 244 formed in the friction lining block 230 and adapted to engage into a notch (not shown) formed on the piston 252 to prevent the rotation of the latter, which is important for constructions making use of an automatic adjuster.

In the embodiment shown on FIGURES 17 to 19, the stirrup 248 is guided by improved key members 272 formed with a constant axial section which simplifies the manufacture, since the key member can be cut as slices of a long section-iron bar. Besides, the suppression on the key members of the tenon projection, intended to interlock the key member between the fixed support limbs, facilitates the mounting of the key members and enables a reduction of the load applied to the spring during assembly of the brake by the amount which is that of the spring deflection corresponding to the height of the tenon, and which is required to enter the key members into the gap between the stirrup end projections and the abutment surface of the key member on the fixed support limbs.

In this embodiment, the key members 272, made from section iron, are formed with an inclined leg 273 directed inwardly and which is inserted between the stirrup end projections 269 and the adjacent edges of the fixed support limbs defining the outer portion of the recess 216. The inclined key member legs 273 are adapted to interlock the stirrup 248 in the recess 216 to prevent the radial escape of the stirrup. Besides, the key members are formed with a straight leg 274 acting as a shim, maintaining in register the symmetry plane of the stirrup and that of the fixed support. Under the action of blade spring 266, the stirrup 248 takes simultaneously support on the two key members in spite of the effect of the weight of the stirrup which, in the conventional mounting position of the brake on the vehicle, is directed vertically, a substantial lowering of the stirrup being prevented by the shim 274 forming part of the lower key member. The inclined leg 273 of the key members may be formed with a beveled shoulder 275 engaged into a complementary notch 276 provided on the fixed support limbs for a suitable positioning of the openings 279 provided at the respective ends of said shoulder, and through which openings extends a clevis 280 which may be formed by a steel pin and which, due to the beveled shape of the shoulder 275, are sufficiently spaced from the ends of the blade spring 266 which takes abutment on the outer edges of the lugs 224.

The blade spring 266 has an outwardly curved portion which takes abutment against the wall of a complementary recess formed in the stirrup portion bridging the disc. The said blade spring is formed with tongues 281 taking abutment onto the wall of notches formed in the right angle projections 229 provided at the periphery of the narrower section of the carrier plate.

For assembling the brake and interlocking the stirrup with the fixed support by means of the key members 272, reserving the liberty of axial movement of the stirrup, the two friction pads 226 are placed into the recess 216, on each side of the disc, and the spring 266 is mounted onto said outer edge while the offset tongues 281 of this reinforcement plates 213 welded to the latter, whereby the slightly hooked ends 267 of said spring take abutment onto said outer edge while the offset tongues 281 of this spring come into engagement with the outer edge of the friction lining carrier plate, namely with the wall of the notches formed in the right angle projections 229 of said plate.

The assembly is covered by the stirrup 248 and the latter is urged inwardly while compressing the spring 266, and clearing a gap defined, on the one hand, by the two vertical edges of the stirrup and the inclined surface of the stirrup end projections 269, and, on the other hand, by the peripheral edges of the fixed support limbs and of the bridge portion of the fixed support interconnecting said limbs. The section iron key members 272 are then introduced into said gap without having to change the position of the stirrup with respect to the fixed support, and the said key members 272 are locked in place by a pair of clevis pins 280 which are inserted into the openings 279, on each side of the fixed support limbs 212, 214, and an untimely escape of the stirrup is thus prevented. Due to the engagement of the shoulders 275 into notches 276 formed in the fixed support limbs, no interference occurs between said clevis pins and the adjacent ends 267 of the blade spring 266. The stirrup is thus guided simultaneously by the key member shim portions 274 which adequately position the stirrup within the recess, as well as by the inclined legs 273 of the said key members which prevent the radial escape of the stirrup, said stirrup being thus connected to the fixed support by the blade spring 266 without subjecting the latter, in the course of the assembly operation, to a load substantially larger than that to which said spring is submitted in use. A stronger spring may thus be used, which improves the connection of the stirrup with the fixed support.

Figure 20:
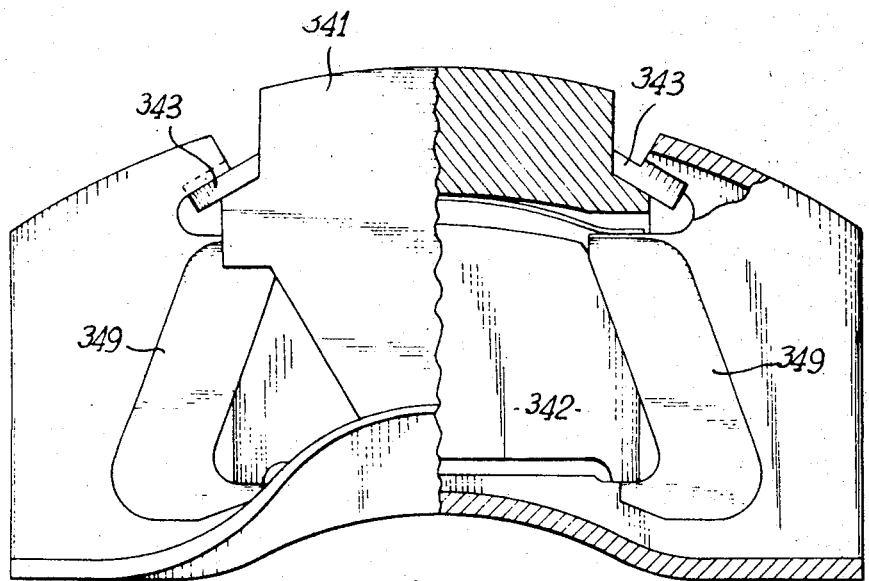
FIGURE 20 is a front view of a further embodiment of the invention, the righthand part of said figure being taken away.
Figure 21:
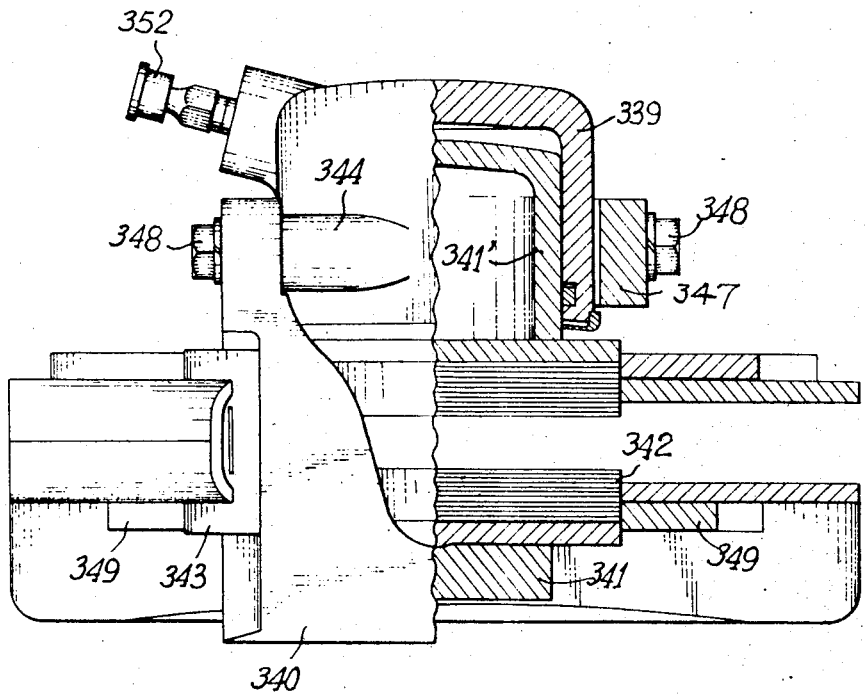
FIGURE 21 is a top view partially in section of the embodiment shown in FIGURE 20.

In the embodiment shown on FIGURES 20 and 21, the cylinder 339 is formed as a separate member embodied in a composite stirrup including a right-angle bracket having one arm 340 straddling the disc and integrally made at one end thereof, with an arm 341 parallel to the disc; the arm 341 may have a shape tapering towards the base of the recess and is arranged in engagement with the fixed friction pad 342 located in the recess formed at the periphery of the fixed support limbs and of the reinforcement, plates 349 having edges colinear with those of the fixed support limbs.

To reduce the weight of the bracket, the arm 340 is formed with a concave groove extended at the respective edges thereof by a pair of extensions shown in section in 347 parallel to the disc and formed with openings (not shown) through which extend screws 348, mounted in threaded bores machined in shoulders 344 provided in the casing of cylinder 339. The friction pads 342 are formed with inclined torque transmitting edges which cooperate with correspondingly inclined anchor ledges bordering the recess formed in the fixed support limbs and in the reinforcement plates 349.

The composite stirrup is locked in the recess provided in the fixed support by key members 343 taking abutment on the outer surface thereof on the peripheral edges of the fixed support limbs and on the opposite surface thereof on the end edges 346 of the angle bracket arm 340 connected to the separate cylinder 339.

This composite stirrup operates in a manner similar to that of the disc brake embodiments described above:

The pressurization of said cylinder 339 results in displacement in one sense of piston 341' and in bringing the adjacent friction pad into engagement with one friction surface of the disc, and creates a reaction which determines a displacement in the opposite sense of the angle bracket 340–341 connected to said cylinder and in the application of the friction pad 342 against the other friction surface of the disc, whereby, the braking torque generated in operation is transmitted by the inclined edges of the friction pads 342 to the correspondingly shaped anchor ledges provided by the fixed support limbs and by the reinforcement plates 349 connected thereto.

I claim:

1. A disc brake including a rotatable disc having a pair of opposed friction surfaces, a fixed support including a pair of limbs parallel to said surfaces, a recess located at the periphery of the fixed support, said recess having a base edge, a pair of anchor ledges, a pair of peripheral lugs projecting inwardly from said limbs towards the symmetry plane of said recess, and a pair of friction pads located in said recess and having projecting end portions defined by braking torque transmitting edges cooperating with the said fixed support anchor ledges, the end portions of said friction pad being restrained by the said lugs from radial movement relative to said disc, said friction pads being extended by a peripheral portion guided with clearance by the inward edges of said lugs.

2. A disc brake including a rotatable disc formed with a pair of opposed friction surfaces, a fixed support including a pair of limbs parallel to said friction surfaces, a recess located at the periphery of the fixed support, said recess having a base edge, a pair of anchor ledges, a pair of peripheral lugs projecting inwardly from said limbs towards the symmetry plane of said recess, and a pair of friction pads located in said recess and including, on the one hand, a metal friction lining carrier plate having projecting end portions defined by braking torque transmitting edges cooperating with the said fixed support ledges, and a pair of notches formed at the peripheral portion of said carrier plate and providing a pair of recesses having a profile complementary to that of said lugs, said carrier plate having said peripheral portion guided with clearance by the inward edges of said lugs, and on the other hand, a friction lining block having substantially the shape of a rectangle the base of which has a length corresponding to that of the lining carrier portion extending with clearance between said lugs, and the height of which corresponds to the distance between the friction pad base and the peripheral edge thereof, said projecting end portions of said carrier plate below said lugs being bare of lining.

3. A disc brake according to claim 2, in which the height of the torque transmitting edges of the carrier plate is comprised between 20% to 50% of the total height of the friction pad and, preferably, forms about 40% of said height.

4. A disc brake according to claim 2, in which the braking torque transmitting edges of the carrier plate are connected by a beveled flat to the edges of the projecting end portions of said carrier plate guided by the inward edge of right angle lugs projecting from said fixed support limbs.

5. A disc brake according to claim 2, in which the recess formed in the fixed support and the friction pads having a complementary shape of said recess are arranged in such a manner that the resultant of the actions of the disc onto the friction pad designated as [D/P]₀ and the resultant of the actions exerted by the friction pads onto the fixed support designated as [S/P]₀ are offset one from another.

6. A disc brake according to claim 2, including a blade spring, the opposite ends of which are supported on the peripheral edges of said lugs having a right angle shape, and having a pair of tongues extending from each end of said blade spring into engagement with the peripheral edge of the friction pads.

7. A disc brake including a rotatable disc formed with opposite friction surfaces, a fixed support formed with two limbs parallel to said friction surfaces, a recess formed at the outer periphery of the said fixed support limbs, a pair of friction pads located in said recess on the opposite sides of the disc, a stirrup operatively connected to said friction members and formed with a pair of angularly-spaced end projections, a spring taking abutment onto the fixed support limbs and biasing said stirrup into engagement with a pair of key members taking abutment on the said limbs, said key members having on the outer surface thereof a profile complementary to that of the peripheral edges of the fixed support limbs and on the inner surface thereof a profile complementary to the outer edge of said angularly-spaced stirrup end portions, said key members having an outwardly extending shim portion positioning the stirrup in the fixed support and an inclined leg portion retaining the stirrup within the recess, said leg portion being formed with a shoulder provided with a pair of openings, through which extend a pair of clevis members projecting outwardly on the opposite sides of the fixed support, said should being inclined in a manner to space the clevis members from the adjacent ends of said spring.

8. A spot-type disc brake comprising a rotatable disc, a U-shaped fixed support straddling the disc, a friction pad located on each side of the disc and mounted in said fixed support to take anchorage thereon upon engagement with the adjacent face of the disc, an axially movable stirrup straddling said disc and friction pads and adapted to move the latter toward the opposite face of the disc upon actuation of actuating means located in one leg of said stirrup, said stirrup having a pair of circumferentially-spaced portions, a recess located at the periphery of said fixed support and having two opposite circumferentially-spaced edges provided with projections extending circumferentially toward each other respectively, resilient means located between said fixed support and said stirrup to urge the latter radially outwardly, and a pair of key members which are radially outwardly urged by said pair of spaced portions respectively into engagement with said projections respectively for preventing radial escape of said stirrup.

9. A spot-type disc brake, as defined in claim 8, wherein each key member is provided with abutment means adapted to engage said fixed support on the one hand and one of said circumferentially-spaced portions of said stirrup on the other hand to limit circumferential displacement of said stirrup within said recess.

10. A spot-type disc brake, as defined in claim 9 wherein said key members are angularly inclined with respect to one another for providing a self-centering effect to the stirrup in said recess under the biasing action of said resilient means.

11. A spot-type disc brake, as defined in claim 10, wherein each key member is provided with locking means for preventing axial escape of said key member from said fixed support.

12. A spot-type disc brake, as defined in claim 11, wherein said locking means comprise a pair of radially extending and outwardly protruding means operatively connected to the corresponding key member at axially-spaced portions thereof to engage at least one limb of said fixed support.

13. A spot-type disc brake, as defined in claim 12, wherein said protruding means comprises two resilient clevis members removably secured to the corresponding key member and located substantially parallel to the two limbs of the fixed support.

14. A spot-type disc brake, as defined in claim 12, wherein said radially extending and outwardly protruding means includes the two lateral faces of a tenon solid with said key member, said lateral faces engaging the inner surfaces of said limbs.

15. A spot-type disc brake, as defined in claim 8, wherein said resilient means is formed as a blade spring fulcrumed at the opposite ends thereof on portions of said opposite circumferentially-spaced edges of said recess, said blade spring having the central portion thereof biased into engagement with the inner wall of the stirrup straddling the disc.

References Cited

UNITED STATES PATENTS

| | | | |
|---|---|---|---|
| 3,051,272 | 8/1962 | Burnett | 188—73 |
| 3,145,807 | 8/1964 | Desuignes et al. | 188—73 |
| 3,265,160 | 8/1966 | Elberg et al. | 188—73 |

MILTON BUCHLER, *Primary Examiner.*

G. E. HALVOSA, *Assistant Examiner.*